(12) United States Patent
Lekson et al.

(10) Patent No.: US 7,394,540 B2
(45) Date of Patent: Jul. 1, 2008

(54) METHODS AND APPARATUSES FOR APPLYING DIFFERENT COLOR CALIBRATIONS AT DIFFERENT LOCATIONS IN AN IMAGING PHOTOMETER MEASUREMENT

(75) Inventors: Matthew Lekson, Woodinville, WA (US); David R. Jenkins, Redmond, WA (US)

(73) Assignee: Radiant Imaging, Inc., Duvall, WA (US)

( * ) Notice: Subject to any disclaimer, the term of this patent is extended or adjusted under 35 U.S.C. 154(b) by 151 days.

(21) Appl. No.: 11/314,959

(22) Filed: Dec. 20, 2005
(Under 37 CFR 1.47)

(65) Prior Publication Data
US 2007/0139644 A1 Jun. 21, 2007

(51) Int. Cl.
*G01N 21/25* (2006.01)
(52) U.S. Cl. .................................................. 356/405
(58) Field of Classification Search ............... None
See application file for complete search history.

(56) References Cited

U.S. PATENT DOCUMENTS 6,982,744 B2 * 1/2006 Jenkins ...................... 348/189

* cited by examiner

*Primary Examiner*—Tu T Nguyen
(74) *Attorney, Agent, or Firm*—Perkins Coie LLP

(57) ABSTRACT

Systems and methods for applying different color calibrations at different locations in an imaging photometer measurement are disclosed herein. In one embodiment, a method for measuring a light source having a first area with a first spectral distribution and a second area having a second spectral power distribution can include selecting one or more data points in the first area for measurement. The method then includes applying a calibration to the selected data points in the first area such that a desired colorimetric result is displayed for each data point in a single colorimetric measurement of the first area. In several embodiments, the method can further include selecting one or more data points in the second area, and applying a different calibration to the selected portions of the second area such that a desired colorimetric result is also displayed for each data point in the second area.

18 Claims, 4 Drawing Sheets

METHODS AND APPARATUSES FOR APPLYING DIFFERENT COLOR CALIBRATIONS AT DIFFERENT LOCATIONS IN AN IMAGING PHOTOMETER MEASUREMENT

TECHNICAL FIELD

The present invention is directed generally toward methods and apparatuses for applying different color calibrations at different locations in an imaging photometer measurement.

BACKGROUND

Visual display manufacturers must simultaneously satisfy several, often competing, requirements. These include the need to minimize the number of individual light sources used, constraints on overall system physical dimensions, and the attainment of high degrees of both color and brightness uniformity. Achieving color and brightness uniformity requirements are particularly complicated by the fact that a single visual display (e.g., automobile instrument panel, cockpit display, signage display) may utilize a mixture of different source types (e.g., incandescent bulbs, light-emitting diodes (LEDs), and/or fluorescent lights) having significantly different spectral characteristics. Accurate calorimeter measurement (i.e., determining luminance and chromaticity coordinates) of such a display can provide several significant challenges.

One conventional process for measuring such displays includes the use of a single luminance meter and/or colorimeter (i.e., a "spot photometer" or "spot colorimeter," respectively) to measure the different portions of the display having different spectral characteristics. This conventional approach can generally provide the necessary measurement with a sufficient degree of accuracy, but this process is far too slow for production applications and, in many cases, most research uses.

Another approach for measuring such displays includes the use of an imaging photometer (e.g., a charge coupled device (CCD) or a complementary metal oxide semiconductor (CMOS) imaging system). A CCD system, for example, can substantially improve the speed and efficiency of testing displays because a CCD array can include a large number of detectors and, accordingly, a single measurement with the CCD system can include a very large number of test points (e.g., in excess of $1 \times 10^6$). Rather than taking many separate spot measurements of a visual display (as necessary with the above-described spot detectors), the CCD system can image the entire display simultaneously and capture many thousands or millions of points in just seconds.

Measuring displays with CCD systems, however, also includes several drawbacks. For example, the transmission of the filters in combination with the camera response generally does not exactly match the tristimulus curves. Accordingly, an accurate color calibration can generally be established for a small color range, but would not be accurate for the entire visible spectrum. This is particularly true of a display that has several different colors using narrow band light sources, such as LEDs in an instrument cluster. One conventional method to overcome this problem is to make several color calibrations and take several measurements to determine the correct chromaticity and luminance values. This method, however, is extremely time consuming and requires significant computing resources (e.g., for post-processing of the data and storage of the large amounts of data). Accordingly, there is a need to improve the systems and methods for measuring visual displays.

DETAILED DESCRIPTION

A. Overview

The present disclosure describes systems and methods for applying different color calibrations at various locations in an imaging photometer measurement. More specifically, sources of light including colors that are physically separated can be measured with an imaging photometer using different color calibrations and luminance scalings at different portions of the measurement. For example, an imaging photometer calibration system in accordance with several embodiments of the invention allows a user to measure a visual display with an imaging photometer and then designate different portions of the image measurement at which to apply different calibrations.

In one particular embodiment, for example, a method for measuring a source of light having a first area with a first spectral distribution and a second area having a second spectral power distribution different than the first spectral power distribution can include selecting one or more data points in the first area for measurement. The method can then include applying a calibration to the selected data points in the first area such that a desired colorimetric result is displayed for each data point in a single colorimetric measurement of the first area. In several embodiments, the method can further include selecting one or more data points in the second area, and then applying a different calibration to the selected portions of the second area such that a desired colorimetric result is also displayed for each data point in the second area.

Many specific details of certain embodiments of the invention are set forth in the following description and in FIGS. 1A-3 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

Figure 1A:
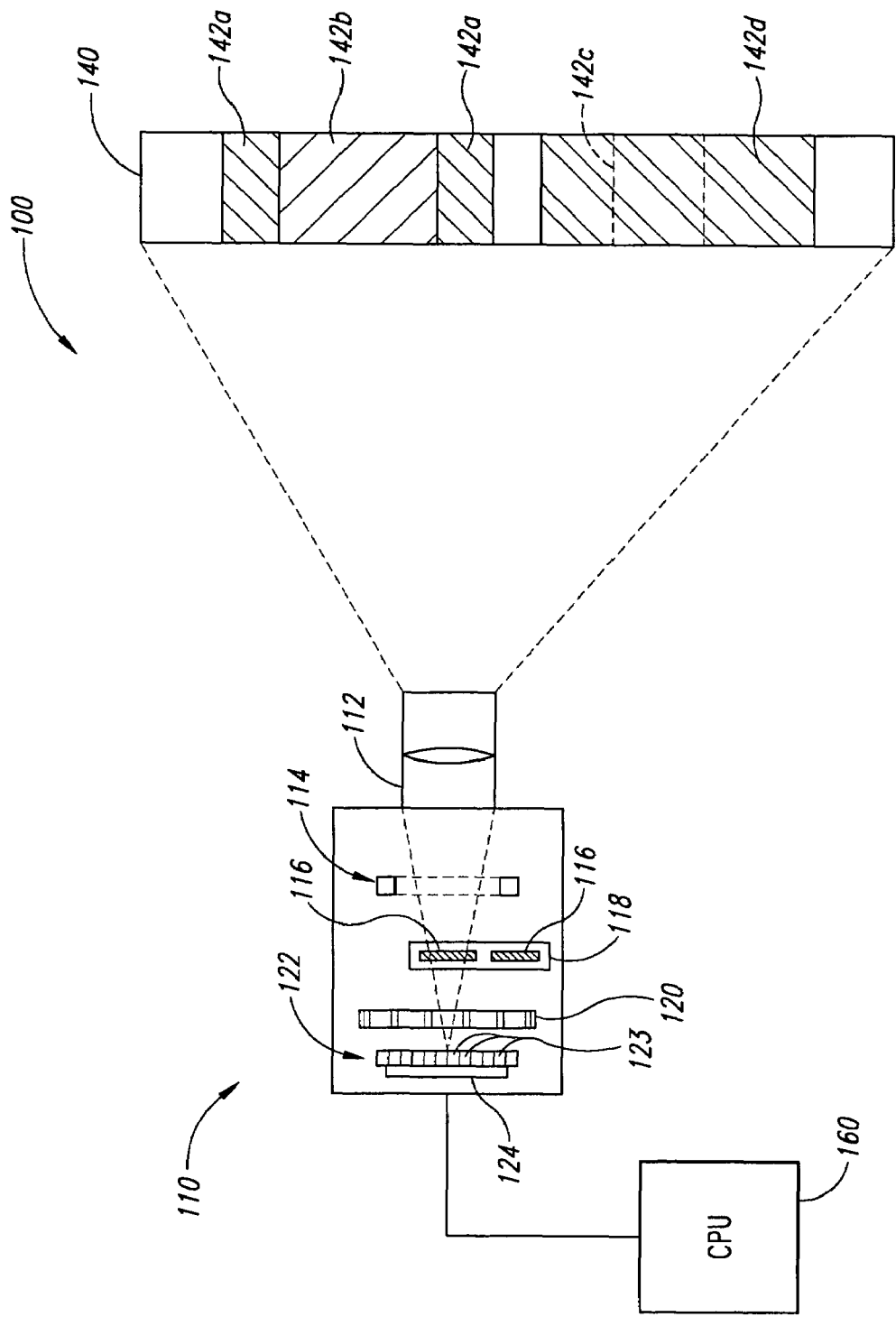
FIG. 1A is a block diagram of an imaging photometer calibration system for applying different color calibrations at different portions in a photometer measurement of a visual display in accordance with several embodiments of the invention.

B. Embodiments of Methods and Apparatuses for Applying Different Color Calibrations at Different Locations in an Imaging Photometer Measurement FIG. 1A is a block diagram of an imaging photometer calibration system 100 for applying different color calibrations at different portions in a photometer measurement of a visual display in accordance with several embodiments of the invention. The system 100 can include an imaging photometer 110, a visual display 140 (e.g., automobile instrument panel, cockpit display, signage display, organic light-emitting diode (OLED) display, etc.) positioned for measurement, and an interface 160 operably coupled to the imaging photometer 110 for processing image data captured from the visual display 140. The system 100 is configured to allow a user to select and calibrate a number of different areas having different spectral power distributions in a single image measurement, rather than having to take a number of different image measurements to calibrate the different areas.

The photometer 110 is positioned at a desired distance from the visual display 140 and configured to capture one or more image measurements from the visual display 140. The distance between the photometer 110 and the visual display 140 can vary depending on the size of visual display 140 and the configuration of the photometer 110. In several embodiments, the photometer 110 can include a CCD digital camera. Suitable CCD-based digital cameras include the ProMetric® 1000 series imaging photometer and calorimeters, the ProMetric® 1400 series imaging photometer and calorimeters, and the ProMetric® 1600 series imaging photometer, radiometer, and colorimeters, which are commercially available from the assignee of the present invention, Radiant Imaging, 15321 Main St. NE, Suite 310, Duvall, Wash. In other embodiments, other CCD-based or CMOS-based cameras may be used.

The imaging photometer 110 can include an imaging lens assembly 112 including one or more lenses (only one lens is shown in the lens assembly 112 of FIG. 1) and a lens aperture 114. The lens assembly 112 is configured to enable the imaging photometer 110 to have sufficient resolution to resolve a desired imaging area on the visual display 140. The lens assembly 112 can include a standard fixed focal length lens (e.g., a 50 mm focal length Nikon mount lens), a zoom lens, or a microscopic lens. In other embodiments, a number of different lenses can be used as long as the particular lens provides sufficient resolution and field-of-view for the imaging photometer 110 to adequately capture image data from the visual display 140.

The imaging photometer 110 can also include color correction filters 116 in a computer-controlled filter wheel 118 and a mechanical shutter 120. The imaging photometer 110 further includes a CCD imaging array 122 having a plurality of pixels 123 arranged in a two-dimensional grid array. The pixels 123 of the CCD imaging array 122 are light-sensitive cells capable of producing an electrical charge proportional to the amount of light they receive. The number of pixels 123 in the horizontal or x-direction and the number of pixels 123 in the vertical or y-direction constitute the resolution of the CCD imaging array 122. The resolution of the CCD imaging array 122 should be sufficient to capture a desired imaging area on the visual display 140. In other embodiments, the CCD imaging array 122 can have a different arrangement of pixels or, as mentioned previously, the imaging array 122 can include a CMOS image sensor.

The imaging photometer 110 can also include a three-stage Peltier cooling system 124 (shown schematically) using three thermoelectric coolers to control the temperature of the CCD imaging array 122. Cooling the CCD imaging array 122 within the imaging photometer 110 allows the photometer to operate at 16-bits analog to digital conversion. A 16-bit CCD implies that up to 65,536 grayscale levels of dynamic range are available to characterize the amount of light incident on each pixel 123.

Figure 1B:
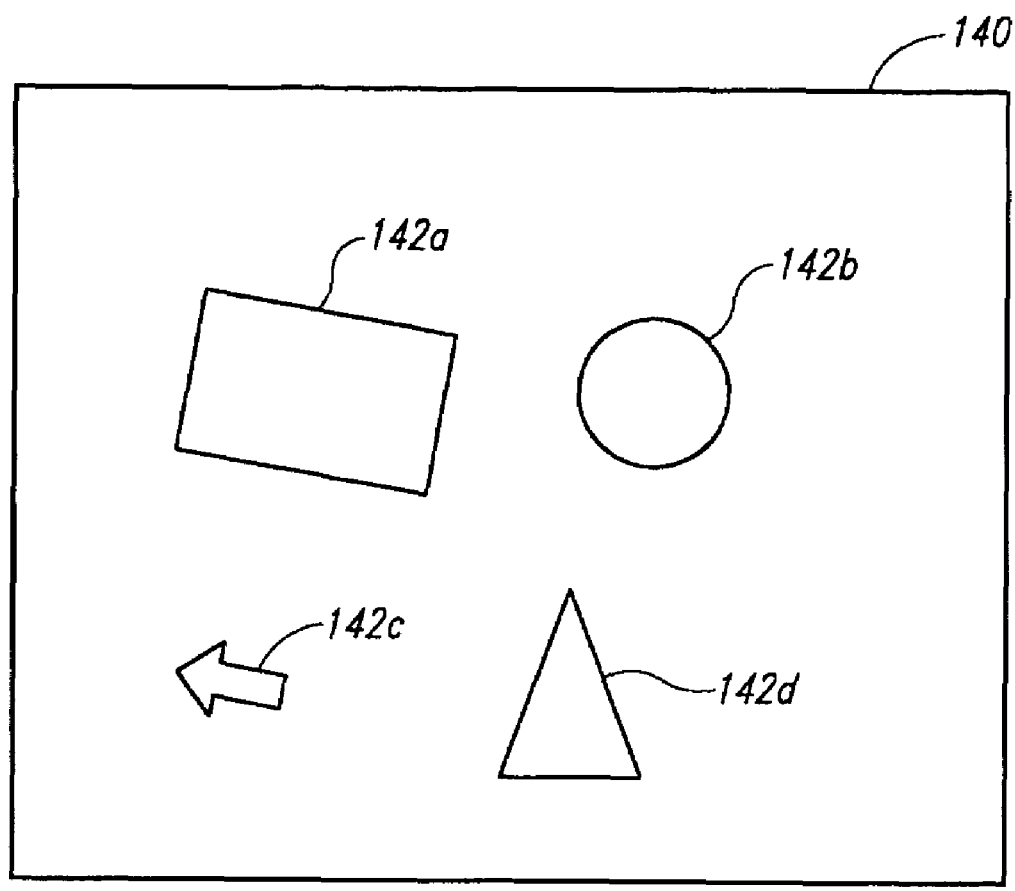
FIG. 1B is a front view of the visual display of FIG. 1A.

FIG. 1B is a front view of the visual display 140. Referring to FIGS. 1A and 1B together, the visual display 140 can include a number of different areas having different spectral characteristics (i.e., different colors, different light sources, etc.). As best seen in FIG. 1B, for example, the visual display 140 includes a first portion 142a having a first spectral characteristic, a second portion 142b having a second spectral characteristic, a third portion 142c having a third spectral characteristic, and a fourth portion 142d (not shown in FIG. 1A) having a fourth spectral characteristic. Each area 142a-d can include a unique spectral power distribution based on the spectral characteristics of the particular area. In other embodiments, the visual display 140 can include a different number of areas having different spectral characteristics.

As mentioned above, the interface 160 is operably coupled to the imaging photometer 110 to receive and process the image data captured from the visual display 140. The interface 160, for example, can include image software to extract the brightness and color data (i.e., luminance $L_v$ and chromaticity coordinates ($C_x$, $C_y$), respectively) from the image data. The interface 160 can also include a database to store image data and calculated calibration or correction data. The image software is flexible enough to properly find and measure the visual display 140, even if the alignment of the imaging photometer 110 and the visual display 140 is not ideal. Further, the image software is adaptable to various sizes and configurations of visual displays 140. Suitable image software for the interface 160, such as ProMetric® 8.5 software, is commercially available from Radiant Imaging. Methods for using the image software to select and calibrate the different areas 142a-d within a single image measurement are discussed in more detail below.

In operation, the imaging photometer 110 can capture an image from the visual display 140 that includes image data from the various areas 142a-d of the visual display 140 having different spectral characteristics. The captured image data is transferred from the imaging photometer 110 to the interface 150. The interface 160 compiles and manages the image data from the imaging photometer 110 and performs a series of calculations to determine the appropriate correction factors (e.g., color calibration and luminance scaling) that should be made to the image data at one or more selected portions of the image measurement. Thus, when subsequent measurements are taken of the visual display 140 (or other visual displays having generally similar arrangements), the interface 160 can post-process the image data to rescale the data from the one or more selected portions of the image measurement with the desired correction factors.

Figure 2:
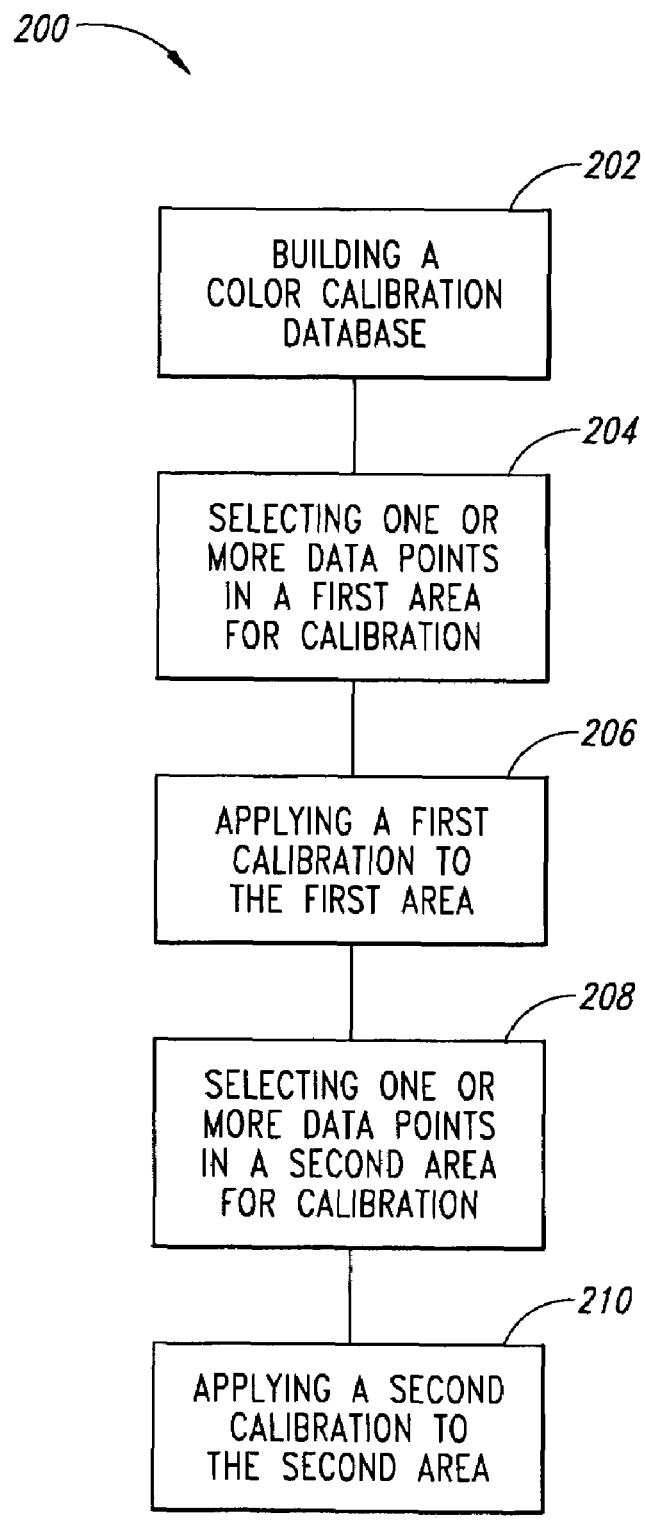
FIG. 2 is a flowchart illustrating various stages of a method for calibrating an imaging photometer in accordance with an embodiment of the invention.

FIG. 2 is a flowchart illustrating various stages of a method 200 for applying different color calibrations at different locations in a single photometer measurement in accordance with several embodiments of the invention. The method 200, for example, can be performed using the system 100 described above with respect to FIGS. 1A and 1B to calibrate the imaging photometer 110 when measuring portions of the visual display 140 having areas with different spectral characteristics. In other embodiments, however, the method 200 can be performed using other suitable systems measuring a variety of different light sources.

Beginning at stage 202, the method 200 includes building a color calibration database for the imaging photometer. Suitable methods for building the color calibration database are disclosed in U.S. patent application Ser. No. 10/092,417, now U.S. Pat. No. 7,012,633, issued Mar. 14, 2006, which is incorporated herein by reference in its entirety. In other embodiments, a four-color calibration technique as proposed by NIST for display measurements could be used to build the color calibration database. In several instances, this method can yield better results for the low light levels of a black portion of an LCD flat panel display while maintaining accuracy for a brightly light colored portion of the display within a user-defined calibration area of a measured image. In still further embodiments, other suitable methods can be used to build the color calibration database.

The color calibration database of stage 202 can be used to determine the color space difference between a standard colorimetric color space (e.g., CIE 1931) and the color space measured using an imaging apparatus (e.g., an imaging photometer or calorimeter as described above). It is generally necessary to perform a calibration of the imaging apparatus so that for a particular area of an image measurement having a particular spectral characteristic, the total specular power measured under the three tristimulus functions ($\bar{x}, \bar{y}, \bar{z}$) yields the same total specular power for the calibration source as the defined standard colorimetric color-matching functions ($\bar{x}_0, \bar{y}_0, \bar{z}_0$). The relationship between the two color spaces can be stated mathematically as follows:

$$\bar{z}_0(\lambda) \neq \bar{z}(\lambda)$$

$$\bar{y}_0(\lambda) \neq \bar{y}(\lambda)$$

$$\bar{x}_0(\lambda) \neq \bar{x}(\lambda) \quad (1)$$

The values $\bar{x}_0(\lambda), \bar{y}_0(\lambda)$ and $\bar{z}_0(\lambda)$ define the standard colorimetric color space and the values $\bar{x}(\lambda), \bar{y}(\lambda)$ and $\bar{z}(\lambda)$ define the color space measured with the imaging apparatus. The total spectral power of those six functions for a particular area's spectrum $L(\lambda)$ can be written as:

$$X_0 = \int L(\lambda) \cdot \bar{x}_0(\lambda) \, d\lambda$$

$$Y_0 = \int L(\lambda) \cdot \bar{y}_0(\lambda) \, d\lambda$$

$$Z_0 = \int L(\lambda) \cdot \bar{x}_0(\lambda) \, d\lambda$$

$$X = \int L(\lambda) \cdot \bar{x}(\lambda) \, d\lambda$$

$$Y = \int L(\lambda) \cdot \bar{y}(\lambda) \, d\lambda$$

$$Z = \int L(\lambda) \cdot \bar{z}(\lambda) \, d\lambda$$

Accordingly, for each particular area of the measurement having a particular spectral characteristic, there is a unique matrix $M_i$ (where i=the number of different areas having specific spectral characteristics) that can supply the correct weighting factors such that $$M_i \begin{pmatrix} X \\ Y \\ Z \end{pmatrix} = \begin{pmatrix} X_0 \\ Y_0 \\ Z_0 \end{pmatrix} \quad (3)$$

Thus, in order to have X, Y, Z match the results that should be obtained with $X_0, Y_0, Z_0$, stage 202 of the method 200 includes calculating calibration or correction matrices $M_i$ for the selected areas of the image measurement and, as discussed below, applying the calibration matrices to selected portions of the image measurement so that a desired colorimetric result is measured for each portion of a single colorimetric measurement. In other embodiments, other suitable methods can be used to calculate the matrix $M_i$.

Figure 3:
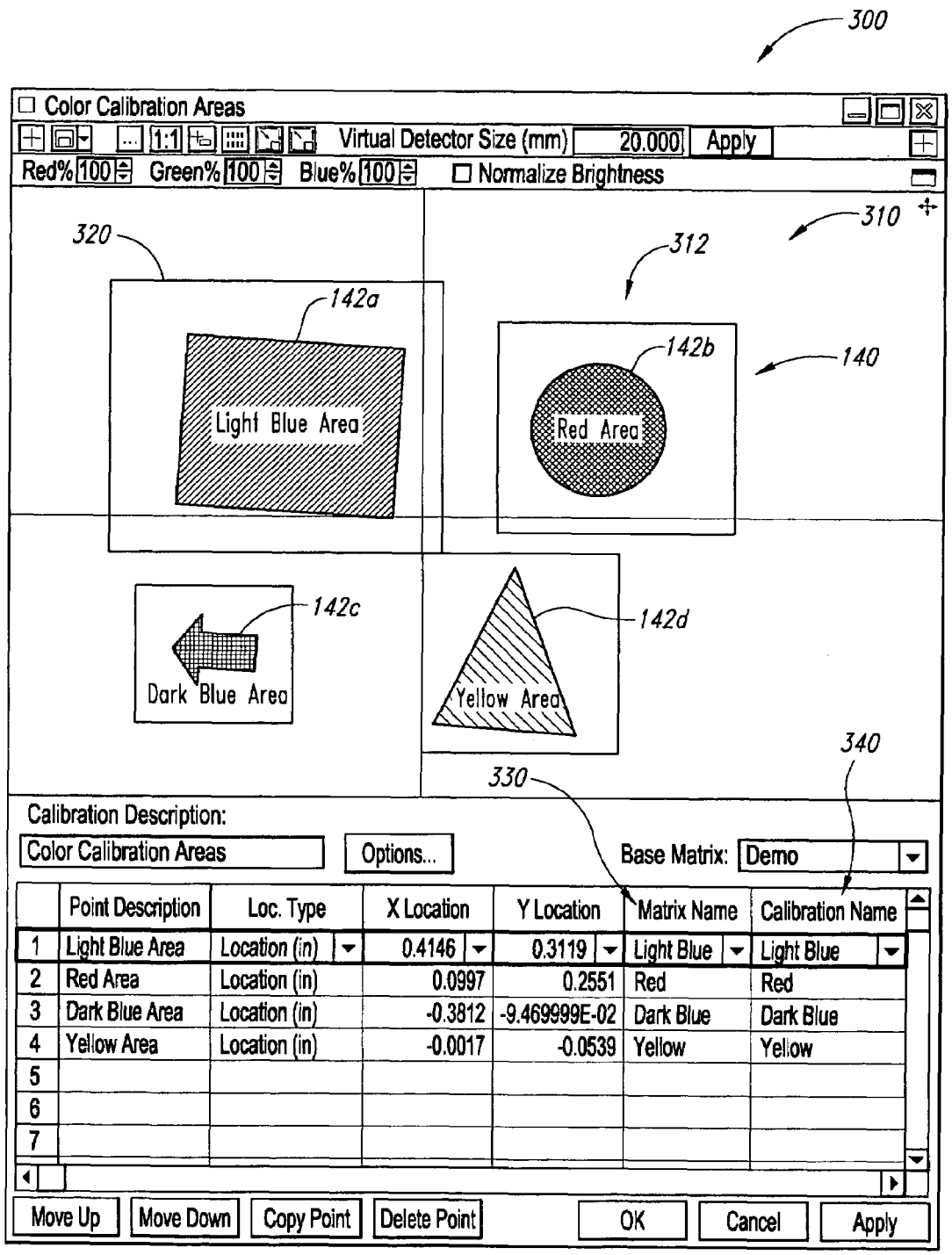
FIG. 3 is a display diagram or screen shot of a stage in the method of FIG. 2 for calibrating an imaging photometer in accordance with an embodiment of the invention.

Referring next to stage 204, the method 200 can include selecting one or more data points in a first area of an image measurement for calibration. FIG. 3, for example, is a display diagram or screen shot of an area selection page 300 in accordance with an embodiment of stage 204 of the method 200. The area selection page 300 can be part of the image software within the interface 160 (FIG. 1A). The page 300 includes a view window 310 illustrating an image measurement 312 from the sample visual display. In the embodiment illustrated in FIG. 3, for example, the image measurement 312 is from the visual display 140 described above with respect to FIGS. 1A and 1B. The area selection page 300 illustrated in FIG. 3 is provided for illustration purposes only and, accordingly, in other embodiments the page 300 can have a different arrangement or include different content.

After taking the image measurement 312, the user (not shown) can select one or more areas within the image measurement 312 for calibration. For example, in the illustrated embodiment the user has drawn a selection box 320 around the first area 142a to select a number of data points that particular area. The selection box 320 can include a rectilinear selection area, a generally arcuate selection area, or any other arbitrary shape that is drawn around one or more selected data points.

At stage 206, the user can then click on a desired matrix name 330 and/or calibration name 340 to apply a particular first calibration to the selected first area. For example, by clicking on the "light blue" matrix name 330 or calibration name 340, the system applies a predefined "light blue" calibration matrix to the selected data points in the first area 142a such that a desired colorimetric result is displayed for each data point in a single colorimetric measurement of the first area 142a. The "light blue" calibration matrix can be "built" in stage 202 of the method 200 described previously.

In mathematical terms, the imaging photometer 110 (including the one or more color filters 116 and CCD image array 122) is configured to detect the tristimulus functions (X, Y, Z) for a number of small points or areas within the visual display 140, including each of the areas 142a-d. As discussed above, the color space measured with the imaging photometer 110 image measurement accordingly yields $\bar{x}(\lambda), \bar{y}(\lambda), \bar{z}(\lambda)$. The desired calibration matrix M can then be selected and applied to any portion of the image measurement (i.e., the area within the selection box 320) and this allows the correct calculation of tristimulus values and chromaticity coordinates (i.e., the correct colorimetric results are measured for each portion) in a single colorimetric measurement of a visual display, even if the display includes different light sources with different spectral characteristics.

Referring next to stage 208, the method 200 can include selecting one or more data points in a second area of the image measurement for calibration. The second area can include a different spectral power distribution than the first area. Accordingly, at stage 210 the method 200 includes applying a second calibration to the second area. The second calibration can be different than the first calibration applied to the first area. This process can be repeated for any number of additional areas of the image measurement being calibrated.

One feature of embodiments of the invention described above with respect to FIGS. 1A-3 is that visual displays including multiple light source types (e.g., vacuum fluorescent, fluorescent, LED, halogen, etc.) within the same visual display can be measured in a single measurement. Compared with conventional methods that require a number of different "spot" measurements, several embodiments of the invention significantly reduce the time required to test a visual display. This feature can increase throughput of tested devices, as well as increasing the accuracy of measurements of the devices.

From the foregoing, it will be appreciated that specific embodiments of the invention have been described herein for purposes of illustration, but that various modifications may be made without deviating from the invention. For example, the systems and methods described above can be used to measure a number of different light sources, such as extended light sources. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A method for measuring a light source with an imaging photometer, the light source including a first area having a first spectral power distribution and a second area having a second spectral power distribution different than the first spectral power distribution, the method comprising:
   determining standard chromaticity coordinates and luminance scalings for the first area and the second area of the light source;
   selecting one or more data points in the first area and the second area for measurement;
   calculating a first calibration for the first area and a second calibration for the second area using the standard chromaticity coordinates and luminance scalings;
   applying the first calibration to the selected data points in the first area such that a desired colorimetric result is displayed for each data point in a single colorimetric measurement of the first area; and
   applying the second calibration to the selected data points in the second area such that a desired colorimetric result is displayed for each data point in a single colorimetric measurement of the first area and second area.

2. The method of claim 1 wherein:
   calculating a first calibration for the first area includes creating a first calibration matrix for the first area that is used to make three tristimulus values (X, Y, Z) as measured by the imaging photometer match three standard tristimulus values ($X_0, Y_0, Z_0$) of the first spectral power distribution of the first area; and
   calculating a second calibration for the second area includes creating a second calibration matrix for the second area that is used to make three tristimulus values (X, Y, Z) as measured by the imaging photometer match three standard tristimulus values ($X_0, Y_0, Z_0$) of the second spectral power distribution of the second area.

3. The method of claim 1 wherein determining standard chromaticity coordinates and luminance scalings for the first area and the second area includes using a spectroradiometer to determine the chromaticity coordinates and luminance scalings.

4. The method of claim 1 wherein selecting one or more data points includes drawing a rectilinear selection area around the one or more data points in the first area and the second area.

5. The method of claim 1 wherein selecting one or more data points includes drawing a generally arcuate selection area around the one or more data points in the first area and the second area.

6. The method of claim 1 wherein selecting one or more data points includes drawing a selection area having a generally arbitrary shape around the one or more data points in the first area and the second area.

7. The method of claim 1 wherein the light source is a first light source, and wherein the method further comprises:
   measuring a second light source different than the first light source, the second light source having a third area with a third spectral power distribution and a fourth area with a fourth spectal power distribution different than the third spectral power distribution, and wherein the first and second calibrations can be used to calibrate selected data points in the third and fourth areas, respectively.

8. A method for measuring a visual display, the method comprising:
   providing a visual display including a first portion having a first spectral power distribution and a second portion having a second spectral power distribution different than the first spectral power distribution;
   selecting a first set of data points in one of the first or second portions for measurement;
   applying a first calibration to the selected first data points in one of the first or second portions such that a desired colorimetric result is displayed for each data point in a single colorimetric measurement of the selected portion, wherein applying a first calibration to the selected data points in the first portion includes creating a first calibration matrix for the first portion that is used to make three tristimulus values (X, Y, Z) as measured by the imaging photometer match three standard tristimulus values $X_0, Y_0, Z_0$) of the first spectral power distribution of the first portion;
   selecting a second set of data points for calibration from the other one of the first or second portions; and
   applying a second calibration to the selected second data points in the other one of the first or second portions such that a desired colorimetric result is displayed for each data point in a single colorimetric measurement of the first portion and the second portion of the visual display, wherein applying a second calibration to the selected data points in the second portion includes creating a second calibration matrix for the second portion that is used to make three tristimulus values (X, Y, Z) as measured by the imaging photometer match three standard tristimulus values ($X_0, Y_0, Z_0$) of the second spectral power distribution of the second portion.

9. The method of claim 8 wherein selecting a first or second set of data points includes drawing a rectilinear selection area around the selected data points.

10. The method of claim 8 wherein selecting a a first or second set of data points includes drawing a generally arcuate selection area around the selected data points.

11. The method of claim 8 wherein selecting a a first or second set of data points includes drawing a selection area having a generally arbitrary shape around the selected data points.

12. The method of claim 8 wherein providing a visual display includes providing at least one of an automobile instrument panel, a cockpit display, a signage display, and an organic light-emitting diode (OLED) display having at least two portions with different spectral characteristics.

13. A method for measuring a visual display with an imaging photometer, the visual display including a first area having a first spectral characteristic and a second area having a second spectral characteristic different than the first spectral characteristic, the method comprising:
- determining standard chromaticity coordinates and luminance scalings for the first area and the second area;
- calculating (a) a first preselected color calibration and luminance scaling for the first area using the standard chromaticity coordinates and luminance scalings, and (b) a second preselected color calibration and luminance scaling for the second area using the standard chromaticity coordinates and luminance scalings;
- selecting at least a portion of the first area for measurement;
- applying the first preselected color calibration and luminance scaling to the selected portion of the first area to reconfigure the selected portion of the first area in accordance with the first preselected color calibration and luminance scaling;
- selecting at least a portion of the second area for measurement; and
- applying the second preselected color calibration and luminance scaling to the selected portion of the second area to reconfigure the selected portion of the second area in accordance with the second preselected color calibration and luminance scaling.

14. The method of claim 13 wherein selecting a set of data points includes drawing a rectilinear selection area around the selected data points.

15. The method of claim 13 wherein selecting a set of data points includes drawing a generally arcuate selection area around the selected data points.

16. The method of claim 13 wherein selecting a set of data points includes drawing a selection area having a generally arbitrary shape around the selected data points.

17. A method for applying different color calibrations at different locations in an imaging photometer measurement, the method comprising:
- measuring a source of light with an imaging photometer, the source of light having two or more portions with different spectral characteristics;
- determining standard chromaticity coordinates and luminance scalings for each of the two or more portions with different spectral characteristics;
- calculating a calibration matrix for each of the two or more portions using the standard chromaticity coordinates and luminance scalings; and
- applying different color calibrations and luminance scalings at each of the two or more portions of the image measurement with different spectral characteristics.

18. A method for measuring a visual display, the method comprising:
- measuring a light source with an imaging photometer and generating an image measurement, the light source including two or more portions having different spectral characteristics;
- determining standard chromaticity coordinates and luminance scalings for each of the two or more portions of the light source;
- calculating a calibration for each of the two or more portions using the standard chromaticity coordinates and luminance scalings; and
- applying different color calibrations and luminance scalings at each of the two or more portions of the image measurement having different spectral characteristics.

* * * * *